United States Patent
Jouhier

(10) Patent No.: US 12,411,845 B2
(45) Date of Patent: Sep. 9, 2025

(54) SQL STATEMENT GENERATOR

(71) Applicant: Sage Global Services Limited, Newcastle upon Tyne (GB)

(72) Inventor: Bruno Claude Jean-Marie Jouhier, Paris (FR)

(73) Assignee: Sage Global Services Limited, Newcastle upon Tyne (GB)

( * ) Notice: Subject to any disclaimer, the term of this patent is extended or adjusted under 35 U.S.C. 154(b) by 0 days.

(21) Appl. No.: 17/574,134

(22) Filed: Jan. 12, 2022

(65) Prior Publication Data

US 2022/0222253 A1    Jul. 14, 2022

(30) Foreign Application Priority Data

Jan. 13, 2021  (EP) .................................. 21151432

(51) Int. Cl.
| | |
|---|---|
| *G06F 16/2452* | (2019.01) |
| *G06F 16/22* | (2019.01) |
| *G06F 16/242* | (2019.01) |
| *G06F 16/2453* | (2019.01) |

(52) U.S. Cl.
CPC .... *G06F 16/24526* (2019.01); *G06F 16/2246* (2019.01); *G06F 16/2448* (2019.01); *G06F 16/24539* (2019.01)

(58) Field of Classification Search
CPC ........... G06F 16/24526; G06F 16/2448; G06F 16/2246; G06F 16/24539
USPC ................................ 707/759, 755, 760, 770
See application file for complete search history.

(56) References Cited

U.S. PATENT DOCUMENTS

| | | | | |
|---|---|---|---|---|
| 7,725,482 | B2* | 5/2010 | Smith ................... | G06F 16/835 |
| | | | | 707/759 |
| 2007/0226196 | A1* | 9/2007 | Adya ................ | G06F 16/24539 |
| 2015/0169689 | A1* | 6/2015 | Schneider ........... | G06F 16/2453 |
| | | | | 707/718 |
| 2016/0063063 | A1* | 3/2016 | Tsai ...................... | G06F 16/284 |
| | | | | 707/755 |
| 2017/0060910 | A1* | 3/2017 | Budhiraja ............. | G06F 16/258 |
| 2017/0068703 | A1* | 3/2017 | Ju ..................... | G06F 16/24542 |
| 2017/0364539 | A1* | 12/2017 | Jacob ................ | G06F 16/24547 |
| 2018/0218031 | A1* | 8/2018 | Wong .................. | G06F 16/2425 |
| 2018/0349463 | A1* | 12/2018 | Bernhardy ............ | G06F 16/213 |

(Continued)

OTHER PUBLICATIONS

Garcia, "Compiler Plugins Can Handle Nested Languages: AST-Level Expansion of LINQ Queries for Java", ICOODB 2009, 2010, pp. 41-58.

*Primary Examiner* — Giovanna B Colan

(74) *Attorney, Agent, or Firm* — Barclay Damon LLP; Daniel McGrath

(57) ABSTRACT

A method of generating a SQL statement for performing a database operation. The method comprises: receiving a database operation instruction relating to an operation to be performed on one or more tables of a relational database, said database operation instruction expressed as at least one function in a general-purpose computing language and in which clauses of the database operation instruction are defined in a body of the at least one function; processing the database operation instruction to identify source code associated with the body of the at least one function; generating an abstract syntax tree from the source code, and translating the abstract syntax tree into a SQL statement corresponding to the database operation instruction.

15 Claims, 8 Drawing Sheets

(56) References Cited

U.S. PATENT DOCUMENTS

2019/0065552 A1\* 2/2019 Brantner ........... G06F 16/24553
2021/0209098 A1\* 7/2021 Shi ...................... G06F 16/2452

\* cited by examiner

"customer" table

| id | name | address_id |
|---|---|---|
| | | |

"customer_address" table

| id | street | city | country |
|---|---|---|---|
| | | | |

"sales_order" table

| id | customer_id | date | amount |
|---|---|---|---|
| | | | |

Fig 2

| Node | Table component metadata | Type metadata |
|---|---|---|
| this | record of customer table | Customer |
| address | address column of customer table | CustomerAddress |
| country | country column of customer_address table | string |
| this.address | join between customer and customer_address tables | CustomerAddress |
| this.salesOrders | join between customer and sales_order tables | SalesOrder |
| order | record of sales_order table | SalesOrder |
| date | date column of sales_order table | Date |
| month | property of date | integer |
| year | property of date | integer |
| amount | amount column of sales_order table | integer |

Fig 4

SQL STATEMENT GENERATOR

CROSS REFERENCE TO RELATED APPLICATIONS

This application claims priority to, and the benefit of, GB Patent Application No. EP21151432.8, filed on Jan. 13, 2021 and entitled "SQL STATEMENT GENERATOR", the contents of which are incorporated herein by reference in their entirety for all purposes.

TECHNICAL FIELD

The present invention relates to methods of generating SQL statements.

BACKGROUND

A widespread and longstanding problem encountered by software developers writing computer programs that interact with relational databases, is how to integrate complex SQL operations such as the generation of SQL queries into general purpose computing languages such as Java, JavaScript, TypeScript, C#, Ruby, Python, PHP, C, C++ and so on.

Not only do SQL operations need to be written in a separate language (i.e. SQL), but the way that relational databases manage data as simple values stored within data tables is fundamentally different to the way general purpose computing languages manage data using objects, functions and methods.

A number of techniques have been attempted to address this problem.

In one example technique, computer code is written in a host language, such as C, but any database operations such as database queries are written in SQL. The resultant hybrid computer code is then input to a specially configured preprocessor which converts it to computer code comprising entirely the host language.

Examples of this technique include "Pro*C" from Oracle and "ESQL/C" from Informix.

This approach is limited as it is particularly "static" as SQL code can typically only be placed in global functions.

In another example technique, a special client library is provided. Computer code is written in a host language and is configured to construct SQL statements as strings. These strings are then passed to the client library. The client library then sends the SQL statements to the database and then returns the result received from the database.

This approach is generally considered more flexible than the use of pre-processors because it is straightforward to write code which forms SQL statements as strings and then pass these strings to a library.

However, this technique normally requires that SQL statements be written verbatim in the source code or assembled from string literals. It is therefore difficult to guarantee that the SQL statements formed by the code and passed to the client library will always be valid. This reduces the chance of errors being detected before runtime. Using this technique also means that an application is potentially vulnerable to malicious code injection attacks. Specifically, there is a risk of "SQL injection" if SQL statements passed to the client library are simply constructed from unverified concatenated strings generated by the source code.

An early example of such a client library is "dblib" from Sybase. An example of a more advanced library which seeks to alleviate some of the drawbacks set out above is "KNEX" library Knex.JS.

In another example technique, object relational mappers (ORMs) are provided. ORMs are software tools that attempt to map the classes of an object-oriented language onto the tables of a SQL database. This mapping is usually expressed as metadata loaded from XML or JSON files.

ORMs work well handling simple database operations such as "CRUD" (Create Read Update Delete) operations and simplifies a lot of boilerplate code that would otherwise be necessary for applications that persist objects (instances of classes) into SQL tables.

However, the simple mapping between tables and classes provided by ORMs does not enable more complex operations, such as complex database queries to be handled. Popular ORMs include "Hibernate" developed by Red Hat and ".NET Entity" developed by the .NET foundation.

In another example technique, an "embedded query language" is provided. An embedded query language is a language that has been specifically designed to validly integrate with a host language in such a way that database queries can be written directly in a body of code of the host language but in a format, and using a syntax, that closely resembles conventional SQL queries.

An example embedded query language is "LINQ" developed by Microsoft for use with languages such as C#.

The use of embedded query languages is generally considered a comprehensive solution to the problem of integrating SQL operations with general purpose languages. However, embedded query languages need to be implemented as new languages. Moreover, developmental control is required of any language into which a new embedded query language is to be embedded. For example, the development of LINQ was facilitated by the fact that the developer (Microsoft) has complete developmental control over the languages into which LINQ is integrated.

It is an aim of embodiments of the invention to address these problems.

SUMMARY OF THE INVENTION

In accordance with a first aspect of the invention, there is provided a method of generating a SQL statement for performing a database operation. The method comprises: receiving a database operation instruction relating to an operation to be performed on one or more tables of a relational database, said database operation instruction expressed as at least one function in a general-purpose computing language and in which clauses of the database operation instruction are defined in a body of the at least one function; processing the database operation instruction to identify source code associated with the body of the at least one function; generating an abstract syntax tree from the source code, and translating the abstract syntax tree into a SQL statement corresponding to the database operation instruction.

Optionally, the syntax tree comprises a hierarchical node tree, the node tree comprising nodes each representing a component of the source code.

Optionally, the method further comprises associating each node of the node tree with a type selected from a plurality of predetermined types.

Optionally, associating the nodes with a type comprises, for each node: mapping the source code variable which that node represents to a table component of the one or more tables; identifying a type of the table component, and mapping the node to said identified type.

Optionally, the method further comprises, generating table component metadata indicative of the mapping of the nodes to the table components; and generating type metadata indicative of the mapping of the nodes to the types; and translating the abstract syntax tree into a SQL statement using the type metadata and table component metadata.

Optionally, the table components comprise one or more of: the one or more tables themselves, columns of the one or more tables, records from the one or more tables, properties of records of the one or more tables and, when the database operation instruction relates to a plurality of tables, joins between pairs of the plurality of tables.

Optionally, the mapping steps are performed by an object relational mapper.

Optionally, processing the database operation instruction to identify source code associated with a body of the function is performed via an introspection API.

Optionally, the method further comprises detecting if the source code comprises syntactical code constructs which cannot be translated into a valid SQL statement, and if so, generating an error message.

Optionally, the general-purpose language is TypeScript.

Optionally, the method is performed by a database operation function forming part of an application written in the general-purpose language.

Optionally, the method further comprises storing the SQL statement in a SQL statement cache.

Optionally, the method further comprises receiving a further database operation instruction, and, if the further database operation instruction corresponds to the database operation instruction, retrieving the SQL statement from the SQL statement cache for use in implementing a database operation.

Optionally, the method further comprises implementing a database operation using the SQL statement.

In accordance with a second aspect of the invention, there is provided a computing system on which is running a computer program for generating a SQL statement in accordance with the first aspect.

In accordance with embodiments of the invention, a technique is provided enabling code which contains database operation instructions (comprising, for example, CRUD operations or more complex operations comprising a combination of CRUD operations) to be written entirely in the host language of the code. Parts of the code that define the database operation instructions are converted into corresponding SQL statements which can then be used to implement the database operation instructions. The database operation instructions can be written entirely in the host language with no requirement of modified or new syntax beyond that which forms part of the host language.

In accordance with examples of the technique, the database operation instructions are written in the form of functions of the host language. In particular, the clauses of the database operation instructions are expressed in the source code of these functions. The source code of these functions is extracted and then converted into an abstract syntax tree. This abstract syntax tree is then translated into a SQL statement which implements the database operation instruction.

Nodes of the abstract syntax tree represent components of the source code. Typically, before the abstract syntax tree is translated into a SQL statement, the nodes of the abstract syntax tree are mapped onto components of tables stored in the database. This mapping is then used to map the nodes of the abstract syntax tree to specific types. Corresponding mapping data is then generated. Typically, this mapping data is then used when translating the abstract syntax tree into a SQL statement to identify the components of the table or tables being operated on and to generate SQL casts where necessary.

The abstract syntax tree can be generated by otherwise conventional abstract syntax tree generators (such as TypeScript parsers), and the mapping operations can be performed by otherwise conventional mapping interfaces (for example ORMs).

Unlike existing techniques, this technique of generating SQL statements does not require a code developer to learn any additional syntax as the database operation instructions can be expressed entirely in the host general purpose computing language. Further, there is no requirement to update the host general purpose computing language (as is the case when using embedded query languages). Finally, the technique is not vulnerable to code injection attacks such as SQL injection attacks.

Advantageously, a SQL statement generator arranged in accordance with embodiments of the invention can be incorporated with a "linter" which means that application code incorporating database operation instructions formulated as described above can be validated before runtime.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which:

FIG. 2 provides a diagram depicting a first and second table stored in accordance with an exemplary embodiment of the invention;

FIG. 4 provides a table depicting the mapping between components of source code of a database operation instruction and tables stored in a relational database in accordance with an exemplary embodiment of the invention;

DETAILED DESCRIPTION

In accordance with embodiments of the invention, a technique is provided that enables database operation instructions, relating to operations to be performed on a relational database, to be written entirely in the host language of the application code and then translated into a SQL statement.

Figure 1A:
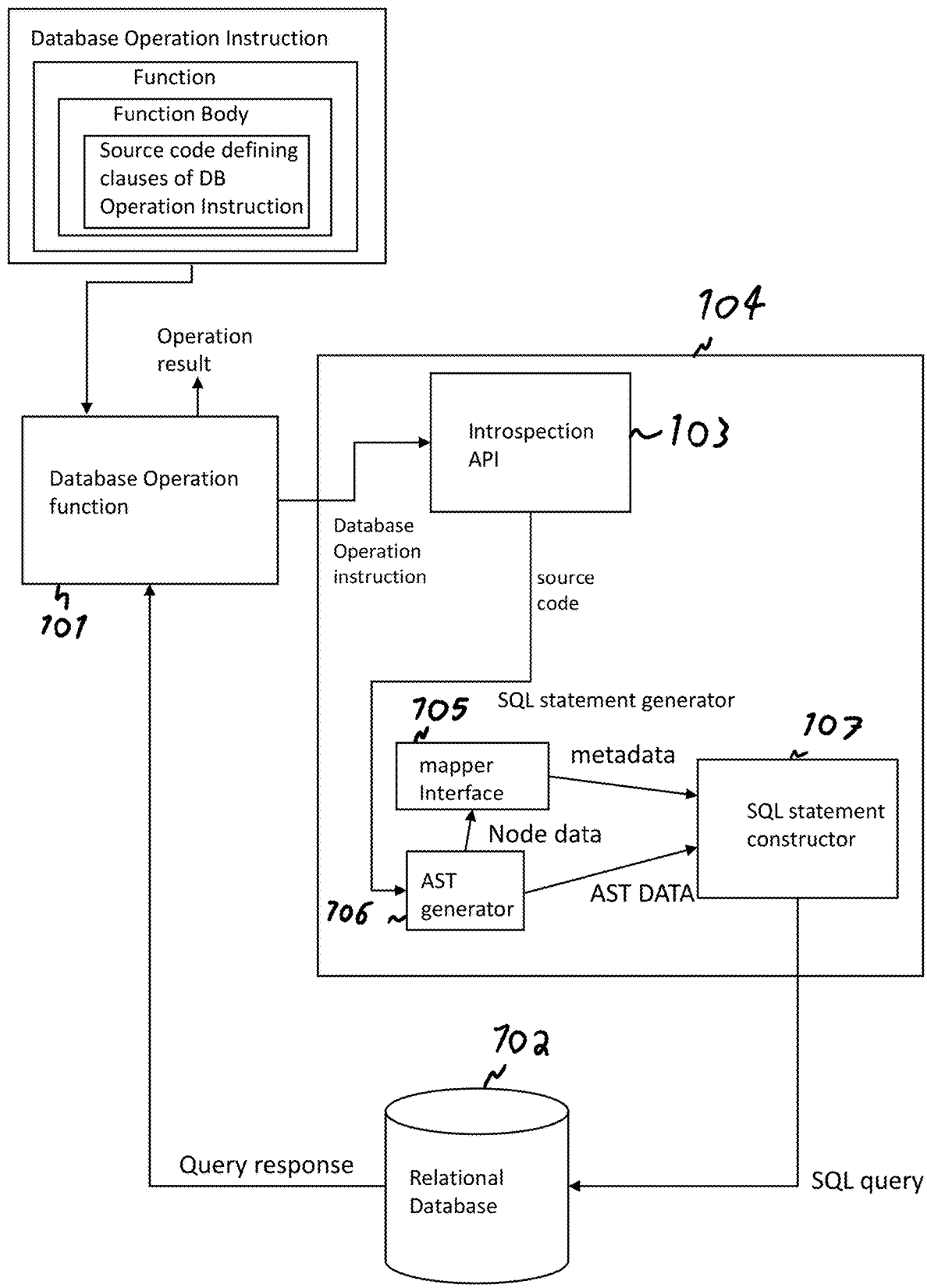
FIG. 1a provides a schematic diagram depicting the generation of a SQL statement in accordance with certain embodiments of the invention.

FIG. 1a provides a schematic diagram illustrating an example of the technique.

The application code comprises a specially configured database operation function 101 which is configured to be passed input arguments defining a database operation instruction relating to an operation to be performed on data held in a relational database 102. Further, if the database operation generates an output (for example the return of data from the database) the database operation function 101 is configured to return as an output, the result of the operation.

The database operation instructions that form the input argument to the database operation function 101 are written in the language in which the application code is written.

More specifically, the database operation instructions are themselves written as one or more functions in the host language. The source code of the bodies of these functions define the clauses of the database operation instruction, that is the specific database commands to be executed on the database in accordance with the database operation instruction.

As explained in more detail below, the source code associated with the bodies of these functions is extracted and converted into abstract syntax tree data which is then translated into a SQL statement.

The database operation function 101 has an interface with a SQL statement generator 104.

When passed a database operation instruction in the format described above (in the form of a function, the body of which defines the clauses of the database operation instruction), the database operation function 101 is configured to pass the database operation instruction to the SQL statement generator 104. The database operation function 101 may pass further information to the SQL statement generator 104. For example, the database operation function 101 may typically receive a further input argument specifying the type of the value or values returned by the database operation function 101. Such a return value type may also be passed to the SQL statement generator 104.

The SQL statement generator 104 comprises an interface to an introspection API 103, a mapper interface 105, an AST (Abstract Syntax Tree) generator 106 and a SQL statement constructor 107.

When the database operation instruction is input to the SQL statement generator 104 it is initially passed to the introspection API 103.

The introspection API 103 is configured to return, typically as a string, the source code associated with the body of each function comprising the database operation instruction. The source code returned by the introspection API 103 is input to the AST generator 106.

The AST generator 106 (provided, for example by a TypeScript parser) is configured to analyse the source code and generate an abstract syntax tree representing the syntactical construction of the source code and thus the syntactical construction of the clause or clauses of the database operation instruction itself.

An abstract syntax tree thus generated, comprises a plurality of nodes, with each node representing a component of the source code. These components comprise variables, values, operators or expressions of the source code. Thus, each node of the abstract syntax tree represents a variable, value, operator or expression. The hierarchical arrangement of these nodes corresponds to the syntactical construction of the source code.

The AST generator 106 is configured to generate AST node data corresponding to the nodes of the AST tree and then pass this AST node data to the mapper interface 105.

On receipt of this AST node data, the mapper interface 105 is configured to map the relevant nodes of the abstract syntax tree to components of the table or tables stored in the relational database 102. Further, where appropriate, the mapper interface 105 is configured to map relevant combinations of nodes to corresponding relationships between the components of the table.

For example, the mappings undertaken by the mapper interface 105 may include, amongst other mappings: mappings that map nodes to tables; mappings that map nodes to records of the tables; mappings that map nodes to columns of the tables; mappings that map nodes to properties of data records from tables (for example from columns of the tables), and mappings that map combinations of nodes to database "joins" between the database tables.

The mapper interface 105 is further configured to map each node to a relevant data type. This is typically achieved by determining a type associated with the table component to which the node has been mapped, and then mapping this type to the node. Thus, for example, nodes associated with data records from a particular table, will be mapped to the type associated with those data records from that table.

The mapper interface 105 is configured to generate node mapping metadata which is representative of these mappings. Specifically, the node mapping data comprises table mapping metadata and type mapping metadata.

In certain embodiments, the mapper interface 105 can be provided by an ORM (Object Relational Mapper) interface.

In alternative embodiments, the mapper interface 105 can be provided by other means. For example, the mapper interface 105 could be provided by software components that read the structure of the database in question (its tables, their columns, their data types, etc.) from the database itself (using for example an information schema for PostgreSQL or system catalogue views for MS/SQL, etc.). In such examples, the mapper interface thus implemented would typically rely on naming conventions for the mapping (for example, a TypeScript SalesOrder type would map to the sales_order table). Such a mapper interface could be configured to automatically convert between different casing conventions, for example PascalCase in TypeScript, snake_case in PostgreSQL.

The node mapping metadata generated by the mapper interface 105 is then communicated from the mapper interface 105 to the SQL statement constructor 107.

The AST generator 106 is further configured to generate AST data which is representative of the abstract syntax tree itself (that is, representative of the nodes and their hierarchical structure). This AST data is communicated from the AST generator 106 to the SQL statement generator 107.

The SQL statement constructor 107 is configured to use the node mapping metadata and the AST data to generate a SQL statement which is output by the SQL statement generator 104.

To generate the SQL statement, the SQL statement constructor 107 identifies from the AST data the expressions of the source code and their corresponding syntax as conveyed by the structure of the abstract syntax tree, and translates them to one or more SQL clauses comprising one or more SQL operators. The variables of the SQL statement are constructed using the mappings provided in the table component metadata (to identify the components of the table or tables being operated on and where appropriate to identify relationships, such as joins, between tables) and using the type metadata to generate SQL casts where necessary.

The SQL statement generator 104 outputs the SQL statement to the relational database 102.

If the SQL statement generates a response (for example, if the SQL statement results in data being retrieved from the relational database 102) the response from the relational database 102 is passed to the database operation function 101 which then outputs a corresponding operation result.

In certain embodiments, the technique described with reference to FIG. 1a can be modified by the provision of a SQL statement cache.

In such examples, the first time that the database operation function 101 processes a database operation instruction, the SQL statement is generated as described above and passed to the relational database 102. However, the database operation instruction and the corresponding SQL statement that was generated by the SQL statement generator 107 are also forwarded to a SQL statement cache 108.

In examples in which a cache is implemented, every time the database operation function 101 is passed a database operation instruction, before interacting with the introspection API 103 and SQL query generator 104 as described above, it accesses the cache to determine if the database operation instruction has been previously processed and a SQL statement already generated. If this is the case, the query function retrieves the SQL statement from the SQL statement cache.

The database operation function 101 is configured to access the cache when it is passed a new database operation instruction and if such a database operation instruction has been previously processed by the SQL query generator 104, the corresponding SQL statement is retrieved from the SQL statement cache and communicated directly to the relational database 102.

Figure 1B:
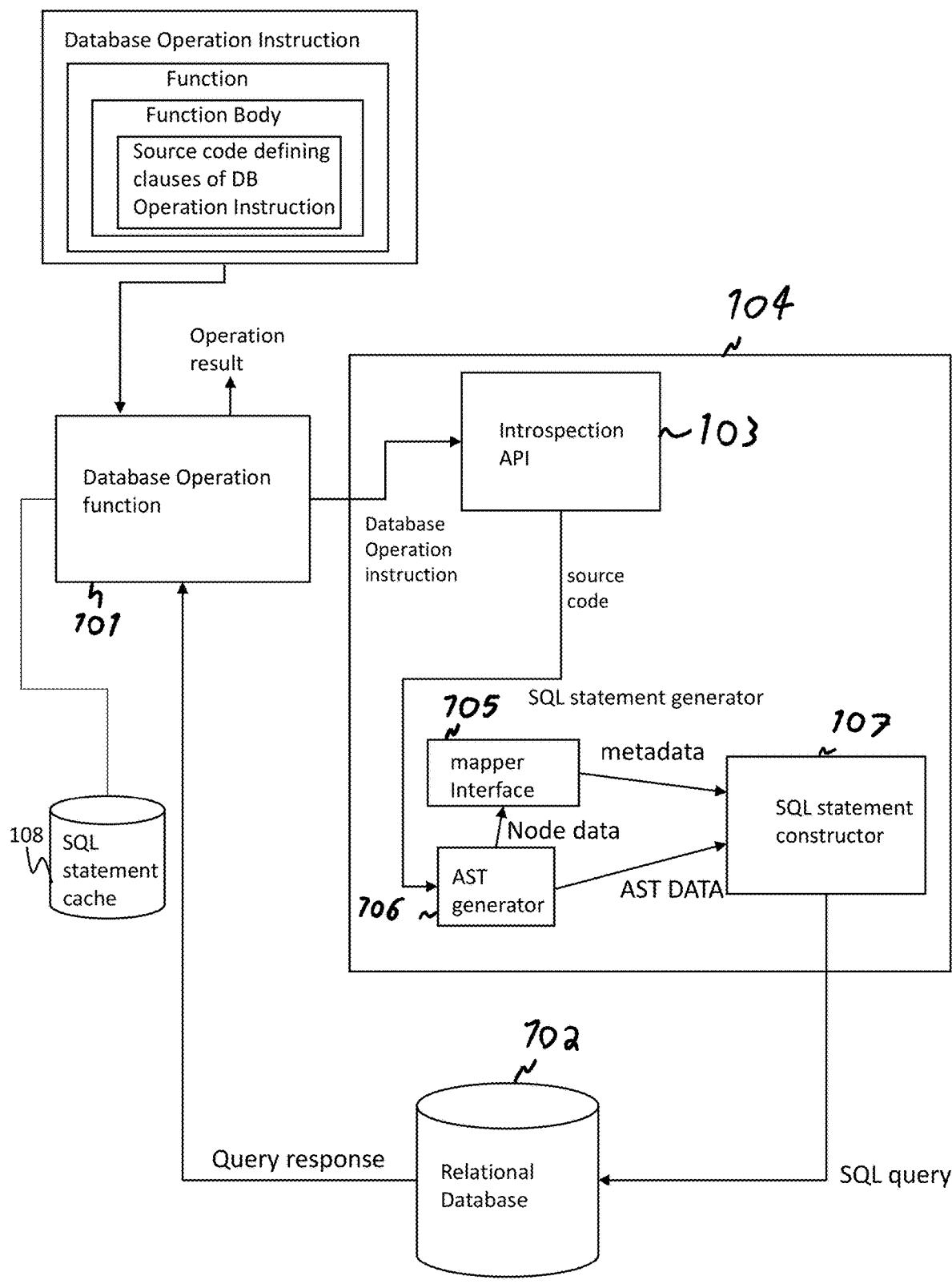
FIG. 1b provides a schematic diagram depicting the generation of a SQL statement in accordance with certain embodiments of the invention and in particular where a SQL statement cache is used.

FIG. 1b provides a schematic diagram depicting an example of the technique corresponding to that described with reference to FIG. 1a except that, as described above, a SQL statement cache 108 is provided.

There now follows a specific example of a method of generating a SQL statement in accordance with an embodiment of the invention. In this example, the database operation instruction comprises a database query requesting the return of a specific set of data from a relational database.

In this example, the database comprises three tables and the data they store relates to customer records, customer address records and sales order records. A first "customer" table comprises a table of records relating to different customers. Specifically, each row of the table comprises data associated with an individual customer. The "customer" table comprises a first column "id" comprising data records of customer identifiers; a second column "name" comprising data records of customer names, and a third column "address_id" comprising data records of customer address identifiers.

A second "customer_address" table comprises a table of customer address records relating to the addresses of the different customers. Specifically, each row of the table comprises data associated with a customer address. The "customer_address" table comprises a first column "id" comprising data records of customer address identifiers; a second column "street" comprising data records of the street names of the customer addresses; a third column "city" comprising data records of the city names of the customer addresses, and a fourth column "country" comprising data records of the country names of the customer addresses.

A third "sales_order" table comprises a table of sales order records relating to different sales orders placed by different customers. Specifically, each row of the table is associated with an individual sales order. The "sales_order" table comprises a first column "id" comprising data records of sales order identifiers; a second column "customer id" comprising data records of customer identifiers; a third column "date" comprising data records of dates associated with the sales orders, and a fourth column "amount" comprising data records of amounts associated with the sales orders.

These tables are depicted in FIG. 2. Arrows are shown in FIG. 2 depicting columns of data records that link the tables. Specifically, the "id" column of the "customer" table corresponds to the "customer id" column of the "sales_order" table and the "address_id" column of the "customer" table corresponds to the "id" column of the "customer_address" table.

In this example, application code for generating a SQL statement for implementing the database query: "select the German customers who have placed at least one order of more than 10,000 euro in May 2020", is provided as follows:

```
const result = query(Customer, {
    filter( ) {
        return this.address.country === 'DE' &&
            this.salesOrders.some(order =>
                order.date.month === 5 &&
                order.date.year === 2020 &&
                order.amount >= 10000);
    }
});
```

In this example, the host language is TypeScript.

In this example, a database operation function is provided, "query( )", which is passed a first argument ("Customer") identifying that the return values of the database query will be of the class "Customer".

The database operation function ("query( )") is passed a second argument providing the database operation instruction:

```
{filter( ) {
    return this.address.country === 'DE' &&
        this.salesOrders.some(order =>
            order.date.month === 5 &&
            order.date.year === 2020 &&
            order.amount >= 10000);
    }
}
```

As can be seen, the database operation instruction comprises a function comprising a function header:
"filter( )",
and a function body.

```
"return this.address.country === 'DE' &&
    this.salesOrders.some(order =>
        order.date.month === 5 &&
        order.date.year === 2020 &&
        order.amount >= 10000);"
```

The body of the function "filter( )" provides source code in the host language (TypeScript) which defines a query clause, which, as described in more detail below, will be converted to a WHERE SQL clause.

As can be seen, the database operation instruction is written using a subset of syntactic constructs of the host language (TypeScript). Specifically, the database operation instruction is expressed as a TypeScript function "filter( )" and the body of the function providing the clauses of the database operation instruction is expressed using conventional TypeScript operators (&&, ===, >=, dot, some method call, etc).

As described above, when the database operation function ("query( )") is passed the database operation instruction ("filter( ) { . . . }"), it passes the database operation instruction ("{filter( ) { . . . }"}) to the SQL statement generator 104. The return class that is being queried ("Customer" in this case) is also passed to the SQL statement generator 104 to specify what the variable "this" represents in the source code from the body of the "filter( )" function.

The database operation function is passed to the introspection API 103 which returns the source code of the body of the "filter( )" function, which, in this case, is:

```
"this.address.country === 'DE' &&
this.salesOrders.some(order =>
    order.date.month === 5 &&
    order.date.year === 2020 &&
    order.amount >= 10000)"
```

The source code of the body of the "filter( )" function is then input to the AST generator 106.

Figure 3:
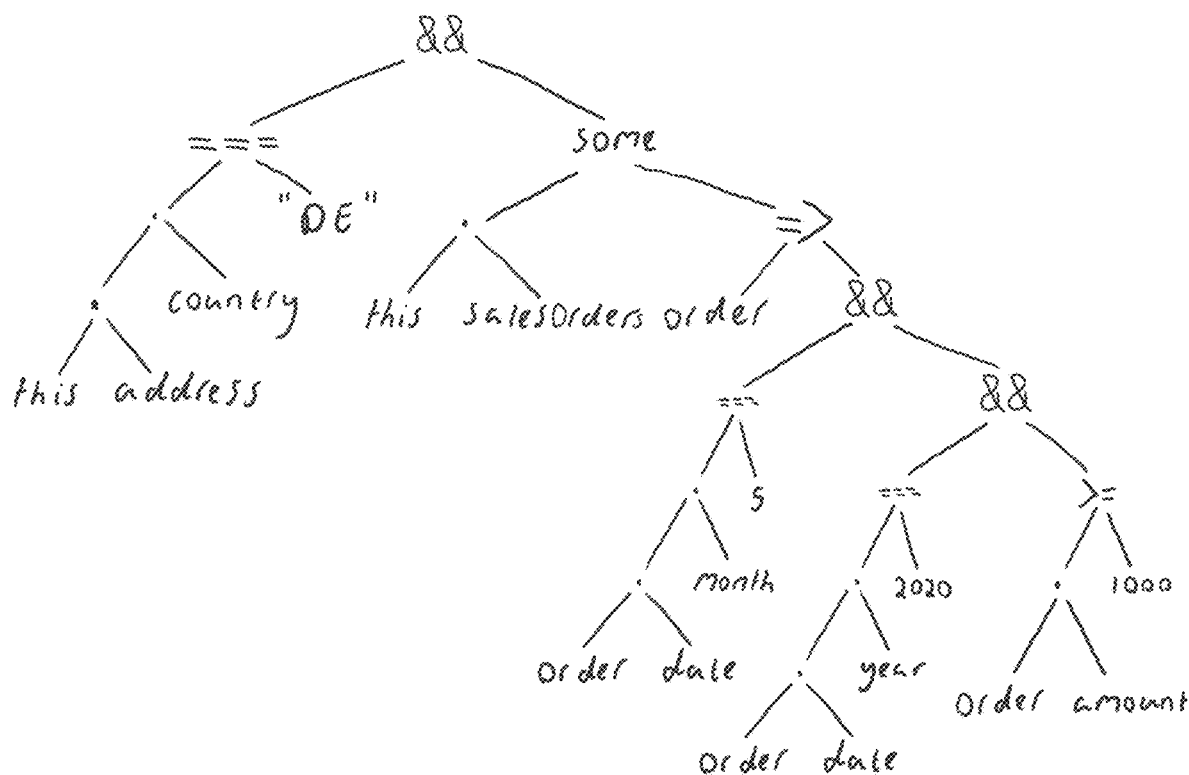
FIG. 3 provides a schematic diagram depicting an abstract syntax tree generated in accordance with an exemplary embodiment of the invention.

The AST generator 106 then converts the source code into an abstract syntax tree. FIG. 3 provides a schematic diagram illustrating the abstract syntax tree of the source code of the body of the "filter( )" function.

As described above, the AST generator 106 then generates AST node data indicative of the nodes of the abstract syntax tree and AST data which is indicative of the abstract syntax tree itself.

As described above, the AST node data is input to the mapper interface 105 which maps the nodes of the abstract syntax tree to components of the tables stored in the relational database and where appropriate, to their relationships. The mapper interface 105 then generates corresponding table component metadata.

Using the table component mappings specified in the table component metadata, the mapper interface 105 further maps the nodes of the abstract syntax tree to appropriate types and generates corresponding type metadata. These mapping operations and the corresponding metadata is depicted in the table shown in FIG. 4.

With reference to FIG. 4: the abstract syntax tree node "this" is mapped to records of the "customer" table; the abstract syntax tree node "address" is mapped to the "address" column of the "customer_address" table; the abstract syntax tree node "country" is mapped to the "country" column of the "customer_address" table; the combination of abstract syntax tree nodes forming the AST branch "this.address" is mapped to a "join" relationship between the "customer" and "customer_address" tables; the combination of abstract syntax tree nodes forming the AST branch "this.salesOrders" is mapped to a "join" relationship between the "customer" and "sales_order" tables; the abstract syntax tree nodes "order" are mapped to records of the "sales_order" table; the abstract syntax tree nodes "date" are mapped to the "date" column of the "sales_order" table; the abstract syntax tree node "month" is mapped to a property of call of the SQL MONTH function on "date" column of the "sales_order" table; the abstract syntax tree node "year" is mapped to a property of call of the SQL YEAR function on the "date" column of the "sales_order" table; and the abstract syntax tree node "amount" is mapped to the "amount" column of the "sales_order" table.

Further, the abstract syntax tree nodes "this" (associated with the return type of the database operation function "query( )") are mapped to the type "Customer"; the abstract syntax tree node "address" (associated with the "address" column of the "customer_address" table) is mapped to the type "CustomerAddress"; the abstract syntax tree node "country" (associated with the "country" column of the "customer_address" table) is mapped to the type "string"; the combination of abstract syntax tree nodes forming the AST branch "this.address" is mapped to the type "CustomerAddress"; the combination of abstract syntax tree nodes forming the AST branch "this.salesOrders" is mapped to the type "SalesOrder"; the abstract syntax tree nodes "date" (associated with the "date" column of the "sales_order" table) are mapped to the type "Date"; the abstract syntax tree node "month" (associated with the property of call of the SQL MONTH function on "date" column of the "sales_order" table) is mapped to the type "integer"; the abstract syntax tree node "year" (associated with the property of call of the SQL YEAR function on the "date" column of the "sales_order" table) is mapped to the type "integer", and the abstract syntax tree node "amount" (associated with the "amount" column of the "sales_order" table) is mapped to the type "integer".

The mapper interface 105 generates node mapping data comprising the table component metadata and the node mapping metadata. This node mapping data is then communicated to the SQL generator 107. Separately, the AST generator 106 communicates the AST data (corresponding to the abstract syntax tree shown in FIG. 3) to the SQL statement constructor 107.

As described above, the SQL statement constructor 107 is configured to use the node mapping metadata and the AST data to generate a SQL statement. The SQL statement constructor 107 identifies from the AST data the expressions of the source code (in this case the expressions "&&", "===", ".", and ">=") and translates them to corresponding SQL operators. The rest of the syntax of the SQL statement is then constructed using the node mapping data. In this example, the following SQL statement is generated:

```
select T0.id
from customers as T0
join addresses as T1 on cust.address_id = T1.id
where
    T1.country = 'DE' and
    (select COUNT(*)
        from sales_orders as T2
        where
            T2.customer_id = T0.id and
            MONTH(T2.date) = 5 and
            YEAR (T2.date) = 2020 and
            T2.amount >= 1000
    ) >= 1
```

Application code comprising database operation instructions and database operation instruction functions as described above would typically run alongside or be integrated with software running the SQL statement generator 104.

Figure 5:
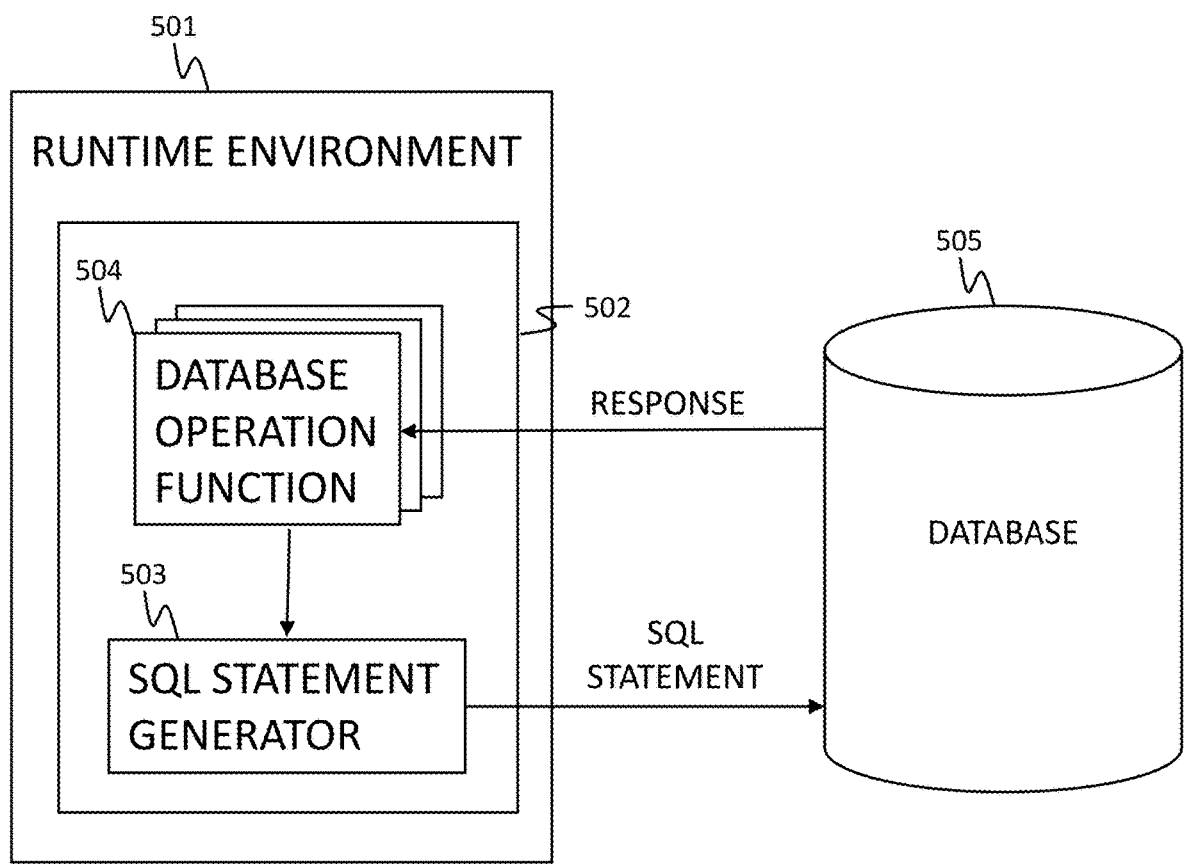
FIG. 5 provides a simplified schematic diagram depicting the implementation of a SQL generator arranged in accordance with certain embodiments of the invention in a runtime environment.

FIG. 5 provides a schematic diagram illustrating a computer system in which an example of the SQL statement generation technique in accordance with embodiments of the invention is implemented.

FIG. 5 shows a runtime environment 501 on which is running an application 502 which comprises compiled code including a SQL statement generator 503 and a plurality of database operation functions 504 provided as described above.

As described above, database operation instructions received by the database operation functions 504 are passed to the SQL statement generator 503.

The SQL statement generator 503 generates a SQL statement implementing the database operation instruction which is sent to a database 505. The database 505 executes the database operation and if necessary generates a response which is communicated back to the database operation function 504 of the application 502.

In accordance with embodiments of the invention, operation of the SQL statement generator 503 is predicated on the SQL statement constructor of the SQL statement generator 503 being able to translate syntactic constructs of the host language (for example the TypeScript operators "&&", "===", ".", and ">=") into corresponding components of a SQL statement. Typically, therefore, the bodies of the functions used to express the database operation instructions that are to be converted into SQL statements can only be written using a subset of the available syntactic constructs of the host language. Should syntactic constructs be used in the host language that can't be translated into SQL, the SQL statement generator 503 will not be able to successfully process the database operation instruction.

To address this, in certain embodiments, a SQL statement generator arranged in accordance with the technique described above is implemented in a code development environment which includes functionality specifically configured to identify if database operation instructions, formulated as described above, contain code that will prevent the database operation instruction from being translated into valid SQL statements at runtime.

Figure 6:
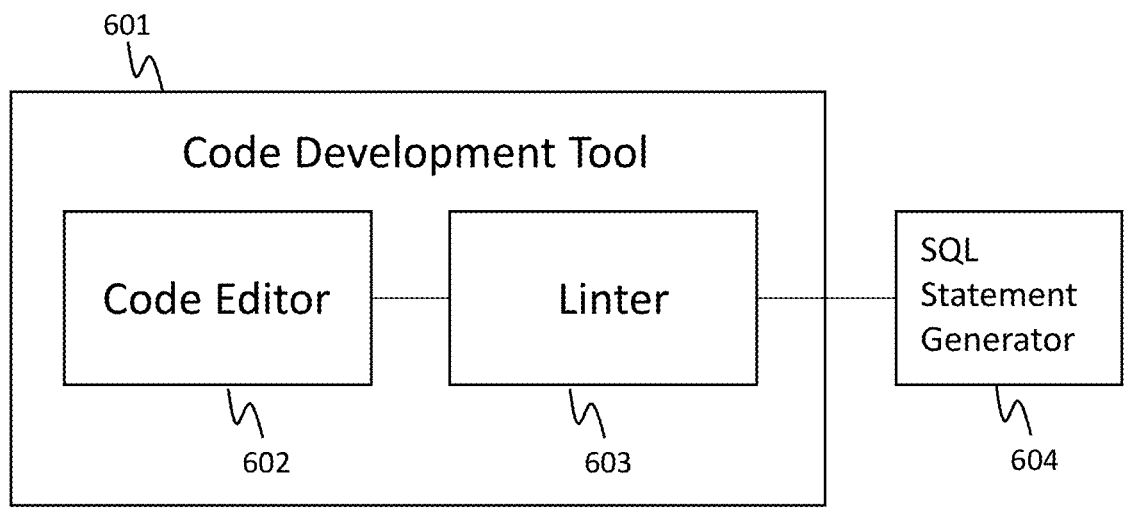
FIG. 6 provides a simplified schematic diagram depicting a code development tool operating in conjunction with a SQL statement generator arranged in accordance with certain embodiments of the invention, and FIG. 7 provides a diagram of a process for generating a SQL statement in accordance with certain embodiments of the invention.

FIG. 6 provides a schematic diagram depicting an example implementation of a technique in accordance with certain examples of the invention.

FIG. 6 shows a code development tool 601. The code development tool 601 can be provided by a suitable software application configured to run on the computing device of a code developer and that enables the code developer to write, test and debug computer code.

The code development tool 601 comprises a code editor 602 which typically provides an interface via which a code developer can enter code using a peripheral device such as a keyboard.

The code editor 602 comprises error detection functions provided by a "linter" which analyses the code as it is being entered by the code developer and identifies errors or potential issues.

In accordance with certain embodiments of the invention the linter 603 is configured to monitor the code entered by the code developer and detect database operation instructions in the form described above. That is, database operation instructions in the form of functions, the source code of the bodies of which define the clauses of the database operation instructions.

The linter 603 is configured to analyse the source code of these functions to detect any code constructs (for example operators) which a SQL statement generator of the type described above would not be able to convert to a valid SQL statement.

If any such code constructs are identified, the linter 603 is configured to control the interface of the code editor 602 to display an error message to the code developer using the code development tool 601. This error message alerts the code developer to the fact that application code contains one or more database operation instructions that cannot be successfully converted into a corresponding SQL statement.

Typically, the linter 603 is configured to achieve this by extracting source code associated with the bodies of the functions of the database operation instructions and pass them to a SQL statement generator 604 arranged as described above and incorporated with the code development environment.

In the event that the SQL statement constructor of the SQL statement generator 604 is unable to transform the AST data into a valid SQL statement, the SQL statement generator 604 is configured to generate an error message which is returned to the linter 603 which then controls an interface of the code editor 602 to display a corresponding error message to the code developer using the code development tool 601.

Figure 7:
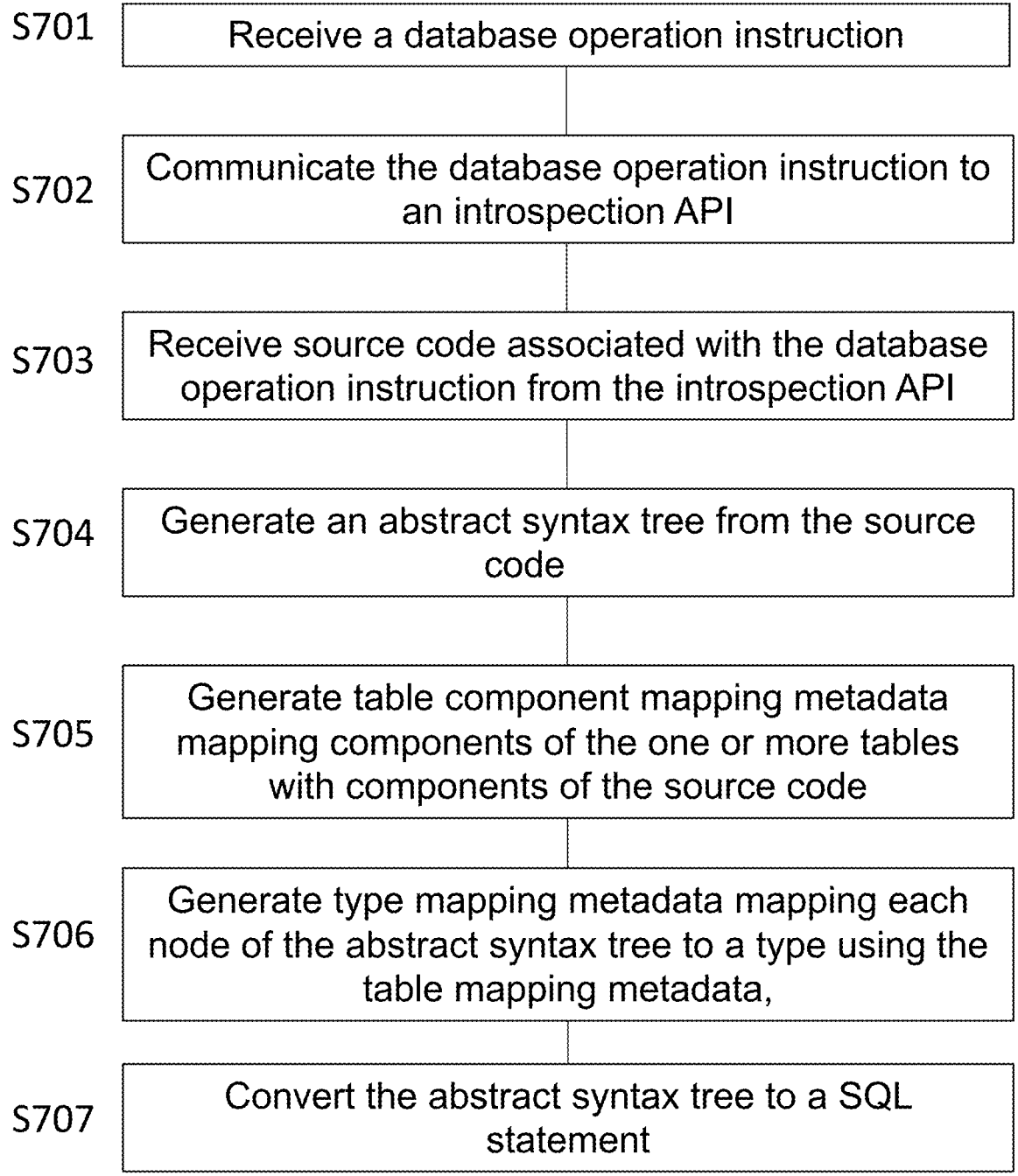

FIG. 7 provides a diagram depicting a process of generating a SQL statement for performing a database operation in accordance with embodiments of the invention.

At a first step S701, a database operation instruction is received relating to an operation to be performed on one or more tables in a relational database. The database operation instruction is expressed as a function in a general-purpose computing language. Clauses of the database operation instruction are defined in a body of the function At a second step S702, the database operation instruction is communicated to an introspection API.

At a third step S703, the introspection API returns source code associated with the database operation instruction.

At a fourth step S704, an abstract syntax tree is generated from the source code. The abstract syntax tree comprises a hierarchical tree of nodes, where each node corresponds to a component of the source code, including variables, values (such as numerical constants), expressions and operators.

At a fifth step S705, table component mapping metadata is generated which maps nodes of the abstract syntax tree which represent components of the source code onto components of the one or more tables of the database to which the database operation instruction relates.

At a sixth step S706, type mapping metadata is generated which maps each node of the abstract syntax tree representative of a component of the source code on to a type. This mapping is based on a type associated with the table component on to which the node has been mapped.

At a seventh step S707, the abstract syntax tree, the table component mapping metadata data and the type mapping metadata data are converted into a SQL statement for implementing the database operation on the relational database.

In the example described above with reference to FIGS. 2, 3 and 4, the host language is TypeScript. However, techniques in accordance with embodiments of the invention can be implemented in any suitable alternative language where introspection APIs are available, including, for example, JavaScript, Python, LISP, Java, and C#.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A method of generating a SQL statement for performing a database operation, said method comprising:
    receiving a database operation instruction relating to an operation performed on one or more tables of a relational database, said database operation instruction comprising a create read update delete (CRUD) operation or a combination of CRUD operations, said database operation instruction expressed as at least one function in a general-purpose computing language and in which clauses of the database operation instruction are defined in a body of the at least one function;
    processing the database operation instruction such that source code is identified, the source code associated with the body of the at least one function;
    generating an abstract syntax tree from the source code, and
    translating the abstract syntax tree into a SQL statement comprising a CRUD operation or a combination of CRUD operations expressed entirely in SQL computing language and corresponding to the CRUD operation or combination of CRUD operations expressed in the general-purpose computing language in the database operation instruction.

2. A method according to claim 1, wherein the syntax tree comprises a hierarchical node tree, the node tree comprising nodes each representing a component of the source code.

3. A method according to claim 2, further comprising associating each node of the node tree with a type selected from a plurality of predetermined types.

4. A method according to claim 3, wherein associating the nodes with a type comprises, for each node:
    mapping the source code variable which that node represents to a table component of the one or more tables;
    identifying a type of the table component; and
    mapping the node to said identified type.

5. A method according to claim 4, further comprising:
    generating table component metadata indicative of the mapping of the nodes to the table components;
    generating type metadata indicative of the mapping of the nodes to the types; and
    translating the abstract syntax tree into a SQL statement using the type metadata and table component metadata.

6. A method according to claim 5, wherein the table components comprise one or more of: the one or more tables themselves, columns of the one or more tables, records from the one or more tables, properties of records of the one or more tables and, when the database operation instruction relates to a plurality of tables, joins between pairs of the plurality of tables.

7. A method according to any of claims 4 to 6, wherein the mapping steps are performed by an object relational mapper.

8. A method according to claim 1, wherein processing the database operation instruction to identify source code associated with a body of the function is performed via an introspection API.

9. A method according to claim 1, further comprising detecting if the source code comprises syntactical code constructs which cannot be translated into a valid SQL statement, and if so, generating an error message.

10. A method according to claim 1, wherein the general-purpose language is TypeScript.

11. A method according to claim 1, wherein the method is performed by a database operation function forming part of an application written in the general-purpose language.

12. A method according to claim 1, further comprising storing the SQL statement in a SQL statement cache.

13. A method according to claim 12, further comprising receiving a further database operation instruction, and, if the further database operation instruction corresponds to the database operation instruction, retrieving the SQL statement from the SQL statement cache for use in implementing a database operation.

14. A method according to claim 1, further comprising implementing a database operation using the SQL statement.

15. A computing system on which is running a computer program for generating a SQL statement in accordance with the method of claim 1.

* * * * *